United States Patent
Oram et al.

(10) Patent No.: US 10,239,784 B2
(45) Date of Patent: Mar. 26, 2019

(54) DEEP NON-FRANGIBLE STRESS PROFILES AND METHODS OF MAKING

(71) Applicant: CORNING INCORPORATED, Corning, NY (US)

(72) Inventors: Pascale Oram, Painted Post, NY (US); Rostislav Vatchev Roussev, Painted Post, NY (US); Vitor Marino Schneider, Painted Post, NY (US); Emily Elizabeth Young, Erin, NY (US)

(73) Assignee: Corning Incorporated, Corning, NY (US)

( * ) Notice: Subject to any disclaimer, the term of this patent is extended or adjusted under 35 U.S.C. 154(b) by 446 days.

(21) Appl. No.: 14/932,411

(22) Filed: Nov. 4, 2015

(65) Prior Publication Data

US 2016/0122240 A1    May 5, 2016

Related U.S. Application Data

(60) Provisional application No. 62/074,872, filed on Nov. 4, 2014.

(51) Int. Cl.
 C03C 3/097 (2006.01)
 C03C 21/00 (2006.01)
(52) U.S. Cl.
 CPC ............ *C03C 21/002* (2013.01); *C03C 3/097* (2013.01)
(58) Field of Classification Search
 None
 See application file for complete search history.

(56) References Cited

U.S. PATENT DOCUMENTS

| | | | | |
|---|---|---|---|---|
| 3,433,611 A * | 3/1969 | Kubichan | ............ | C03C 21/002 501/63 |
| 3,798,013 A | 3/1974 | Inoue et al. | | |
| 3,936,287 A | 2/1976 | Beall et al. | | |
| 4,042,405 A | 8/1977 | Krohn et al. | | |
| 4,736,981 A | 2/1988 | Pierson et al. | | |
| 5,350,607 A | 9/1994 | Tyson et al. | | |
| 5,773,148 A | 6/1998 | Charrue et al. | | |
| 5,895,768 A | 4/1999 | Speit | | |
| 6,111,821 A | 8/2000 | Bach | | |
| 8,158,543 B2 | 4/2012 | Dejneka et al. | | |
| 8,312,789 B2 | 11/2012 | Beck | | |
| 8,349,455 B2 | 1/2013 | Kondo et al. | | |
| 8,415,013 B2 | 4/2013 | Barefoot et al. | | |
| 8,431,502 B2 | 4/2013 | Dejneka et al. | | |
| 8,561,429 B2 | 10/2013 | Allan et al. | | |
| 8,586,492 B2 | 11/2013 | Barefoot et al. | | |
| 8,623,776 B2 | 1/2014 | Dejneka et al. | | |
| 8,652,978 B2 | 2/2014 | Dejneka et al. | | |
| 8,756,262 B2 | 6/2014 | Zhang | | |
| 8,783,063 B2 | 7/2014 | Osakabe et al. | | |
| 8,802,581 B2 | 8/2014 | Dejneka et al. | | |
| 8,946,103 B2 | 2/2015 | Dejneka et al. | | |
| 8,951,927 B2 | 2/2015 | Dejneka et al. | | |
| 8,957,374 B2 | 2/2015 | Liu et al. | | |
| 8,969,226 B2 | 3/2015 | Dejneka et al. | | |
| 9,140,543 B1 | 9/2015 | Allan et al. | | |
| 9,156,724 B2 | 10/2015 | Gross | | |
| 9,290,407 B2 | 3/2016 | Barefoot et al. | | |
| 9,290,413 B2 | 3/2016 | Dejneka et al. | | |
| 2005/0250639 A1 | 11/2005 | Siebers et al. | | |
| 2007/0060465 A1 | 3/2007 | Varshneya et al. | | |
| 2009/0197088 A1 * | 8/2009 | Murata | ............... | C03C 3/083 428/410 |
| 2010/0003508 A1 | 1/2010 | Arrouy et al. | | |
| 2010/0028607 A1 | 2/2010 | Lee et al. | | |
| 2010/0087307 A1 | 4/2010 | Murata et al. | | |
| 2010/0119846 A1 | 5/2010 | Sawada | | |
| 2011/0014475 A1 | 1/2011 | Murata | | |
| 2011/0165393 A1 | 7/2011 | Bayne et al. | | |

(Continued)

FOREIGN PATENT DOCUMENTS

EP    700879    3/1996
EP    2415724   2/2012

(Continued)

OTHER PUBLICATIONS

Aegerter et al "Sol-gel technologies for glass producers and users—Chapter 4.1.8—Scratch resistant coatings (G. Helsch and G. H. Frischat)", pp. 217-221, Kluwer Academic Publishers, 2004.
Amin et al; U.S. Appl. No. 14/926,425, filed Oct. 29, 2015, titled "Strengthened Glass With Ultra-Deep Depth of Compression".
Bahlawane "Novel sol-gel process depositing a-Al2O3 for the improvement of graphite oxidation-resistance"—Thin Solid Films, vol. 396, pp. 126-130, 2001.
Dessler et al; "Differences between films and monoliths of sol-gel derived aluminas", Thin Solid Films, vol. 519, pp. 42-51, 2010.
Fu, et al, "Preparation of alumina films from a new sol-gel route" Thin Solid films 348, pp. 99-102 (1999).
Hauk "Sol-gel preparation of scratch-resistant Al2O3 coatings on float glass", Glass Science and Technology: Glastechnische Berichte, 72(12), pp. 386, 1999.

(Continued)

*Primary Examiner* — Robert C Boyle
(74) *Attorney, Agent, or Firm* — Timothy M. Schaeberle; Jeffrey A. Schmidt

(57) ABSTRACT

A non-frangible glass article strengthened by a dual or two-step ion exchange (IOX) process, where the first IOX step leads to a depth of compressive layer FSM_DOL>0.1·t or, in some embodiments, FSM_DOL>0.15·t, where t is the thickness of the glass, is provided. The glass article has a compressive stress CS1 after the first IOX step at the surface of from 100 MPa to 400 MPa or, in some embodiments, from 150 MPa to 300 MPa. The first IOX step is followed by a second IOX step, leading to a "spike" compressive stress CS2 after the second IOX step at the surface of greater than 500 MPa or, in some embodiments, 700 MPa. The width of the spike generated by the second IOX is between 1 μm and 30 μm, or between 8 μm and 15 μm, using the criteria where the magnitude (absolute value) of the slope of the spike is higher than 20 MPa/μm.

12 Claims, 6 Drawing Sheets

(56) References Cited

U.S. PATENT DOCUMENTS

| | | |
|---|---|---|
| 2011/0226832 A1 | 9/2011 | Bayne et al. |
| 2011/0294649 A1* | 12/2011 | Gomez ............... C03C 21/001 501/66 |
| 2012/0052271 A1 | 3/2012 | Gomez et al. |
| 2012/0052275 A1 | 3/2012 | Hashimoto et al. |
| 2012/0135153 A1 | 5/2012 | Osakabe et al. |
| 2012/0135226 A1 | 5/2012 | Bookbinder et al. |
| 2012/0171497 A1 | 7/2012 | Koyama et al. |
| 2012/0196110 A1 | 8/2012 | Murata et al. |
| 2012/0219792 A1 | 8/2012 | Yamamoto et al. |
| 2012/0308827 A1 | 12/2012 | Boek et al. |
| 2012/0321898 A1 | 12/2012 | Meinhardt et al. |
| 2013/0017380 A1 | 1/2013 | Murata et al. |
| 2013/0045375 A1 | 2/2013 | Gross |
| 2013/0101798 A1 | 4/2013 | Hashimoto |
| 2013/0122260 A1 | 5/2013 | Liang |
| 2013/0122284 A1 | 5/2013 | Gross |
| 2013/0183512 A1 | 7/2013 | Gy et al. |
| 2013/0202868 A1 | 8/2013 | Barefoot et al. |
| 2013/0224492 A1* | 8/2013 | Bookbinder ......... C03C 21/002 428/410 |
| 2013/0236666 A1 | 9/2013 | Bookbinder et al. |
| 2013/0236699 A1 | 9/2013 | Prest et al. |
| 2013/0240025 A1 | 9/2013 | Bersano et al. |
| 2013/0309613 A1 | 11/2013 | O'Malley et al. |
| 2014/0050911 A1 | 2/2014 | Mauro et al. |
| 2014/0087159 A1 | 3/2014 | Cleary et al. |
| 2014/0106172 A1 | 4/2014 | Dejneka et al. |
| 2014/0113141 A1 | 4/2014 | Yamamoto et al. |
| 2014/0139978 A1 | 5/2014 | Kwong |
| 2014/0150525 A1 | 6/2014 | Okawa et al. |
| 2014/0193606 A1 | 7/2014 | Kwong |
| 2014/0370264 A1 | 12/2014 | Ohara et al. |
| 2015/0030834 A1 | 1/2015 | Morey et al. |
| 2015/0030838 A1 | 1/2015 | Sellier et al. |
| 2015/0132563 A1 | 5/2015 | O'Malley et al. |
| 2015/0147575 A1 | 5/2015 | Dejneka et al. |
| 2015/0183680 A1 | 7/2015 | Barefoot et al. |
| 2015/0239775 A1 | 8/2015 | Amin et al. |
| 2015/0239776 A1 | 8/2015 | Amin et al. |
| 2015/0259244 A1 | 9/2015 | Amin et al. |
| 2015/0368148 A1 | 12/2015 | Duffy et al. |
| 2015/0368153 A1 | 12/2015 | Pesansky et al. |

FOREIGN PATENT DOCUMENTS

| | | |
|---|---|---|
| GB | 1334828 | 10/1973 |
| JP | 2009099239 | 5/2009 |
| JP | 2010202514 | 9/2010 |
| JP | 2011213576 A | 10/2011 |
| WO | 2005091021 | 9/2005 |
| WO | 2010005578 | 1/2010 |
| WO | 2011077756 | 6/2011 |
| WO | 2011149811 A1 | 12/2011 |
| WO | 2012074983 | 6/2012 |
| WO | 2012126394 | 9/2012 |
| WO | 2013088856 | 6/2013 |
| WO | 2013136013 | 9/2013 |
| WO | 2013184205 | 12/2013 |
| WO | 2015127483 | 8/2015 |
| WO | 2016070048 A1 | 5/2016 |

OTHER PUBLICATIONS

International Search Report and the Written Opinoin of the International Searching Authority; PCT/US2015/035448; dated Sep. 18, 2015; 11 Pages.

Oram et al; U.S. Appl. No. 14/932,411, filed Nov. 4, 2015, Titled "Deep Non-Frangible Stress Profiles and Methods of Making".

International Search Report and Written Opinion of the International Searching Authority; PCT/US2015/023507; dated Oct. 19, 2015; 19 Pages.

International Search Report and Written Opinion of the International Searching Authority; PCT/US2015/034996 dated Jan. 4, 2016; 13 Pages.

International Search Report and Written Opinion of the International Searching Authority; PCT/US2015/058322 dated Jan. 8, 2016; 14 Pages.

International Search Report and Written Opinion of the International Searching Authority; PCT/US2015/058919;dated Jan. 11, 2016; 11 Pages.

International Search Report and Written Opinion of the International Searching Authority; PCTUS2015041976; dated Oct. 29, 2015; 11 Pages.

Pflitsch et al; "Sol-gel deposition of chromium doped aluminum oxide films (Ruby) for surface temperature sensor application", Chem. Mater., vol. 20, pp. 2773-2778, 2008.

Stosser et al "Magnetic Resonance investigation of the process of corundum formation starting from sol-gel precursors", J. Am. Ceram. Soc, vol. 88, No. 10, pp. 2913-2922, 2005.

International Search Report and Written Opinion PCT/US2016/034634 dated Nov. 2, 2016.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

\* cited by examiner

DEEP NON-FRANGIBLE STRESS PROFILES AND METHODS OF MAKING

This application claims the benefit of priority under 35 U.S.C. § 119 of U.S. Provisional Application Ser. No. 62/074,872 filed on Nov. 4, 2014 the content of which is relied upon and incorporated herein by reference in its entirety.

BACKGROUND

The disclosure relates to stress profiles in glasses. More particularly, the disclosure relates to glasses having deep compressive stress profiles. Even more particularly, the disclosure relates to glasses having deep compressive stress profiles and exhibiting non-frangible behavior.

Chemically strengthened glasses are widely used in displays for hand-held electronic devices such as phones, notebooks and the like. Chemical strengthening creates a compressive layer at the surface of the glass and a tensile region in the central portion of the glass. Compressive stress (CS) and depth of layer (DOL) are typically determined from surface stress measurements (FSM) using commercially available instruments such as, for example, the FSM-6000, surface stress meter manufactured by Luceo Co., Ltd. (Tokyo, Japan) or the like.

For strengthened glass articles in which the compressive stress layers extend to deeper depths within the glass, the FSM technique may suffer from contrast issues that affect the observed DOL. At deeper DOL values, there may be inadequate contrast between the TE and TM spectra, thus making the calculation of the difference between TE and TM spectra—and accurately determining the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements such as, for example, ion exchange of sodium for lithium, that are present in the glass.

SUMMARY

The present disclosure extends the range of possible compressive stress profiles. Modifications to metrology based on the Orihara FSM instrument have enabled measurement of are chemically strengthened glasses with "super-deep" depth of compressive layer DOL; i.e., glass samples having a depth of compressive layer of greater than about 120 μm and, in some embodiments, greater than about 140 μm with standard deviation around 4 μm, as determined by surface stress/FSM measurements (referred to herein as "FSM_DOL" or simply "DOL"). In some embodiments, the DOL may be about 186 μm with a standard deviation of about 10 μm have been obtained. The glasses are non-frangible—i.e., the glasses do not exhibit frangible (explosive or energetic fragmentation) behavior upon impact or insult.

Accordingly, in one aspect, a strengthened glass article is provided. The glass article has a thickness t and a compressive layer extending from a surface of the glass article to a depth of layer DOL of greater 0.1·t. The glass article has a maximum compressive stress CS of greater than about 500 MPa at the surface, a stress profile having a spike region in a range from about 1 μm to about 30 μm. The stress profile in the spike region has a slope. The slope has an absolute value of greater than about 20 MPa/μm.

In another aspect, a glass article having a thickness t in a range from about 0.2 mm to about 1.5 mm, a compressive layer extending from a surface of the glass article to a depth of layer DOL or depth of compression DOC, and a tensile region under a physical center tension CT extending from the depth of layer or depth of compression to the center of the glass at t/2 is provided. The physical center tension CT is greater than $|-1.956 \times 10^{-16} \times t^6 + 1.24274 \times 10^{-12} \times t^5 - 3.09196 \times 10^{-9} \times t^4 + 3.380391 \times 10^{-6} \times t^3 - 2.35207 \times 10^{-3} \times t^2 + 5.96241 \times 10^{-1} \times t + 36.5994|$, and the glass article has a total elastic energy normalized per thickness of the glass $E_{total}$, wherein $(E_{total}/t) = 174.75$ J/m²·mm.

In yet another aspect, a glass article having a thickness t in a range from about 0.3 mm to about 1 mm, a compressive layer extending from a surface of the glass article to a depth of layer DOL or depth of compression DOC, and a tensile region under a physical center tension CT extending from the depth of layer or depth of compression to the center of the glass at t/2 is provided. The physical center tension CT is greater than $|-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, and has an elastic energy stored in the interior of the sample in tension of $E_{interior}$, wherein $(E_{interior}/t) = 30$ J/m²·mm.

In another aspect, a glass article strengthened by a two-step ion exchange (IOX) process and having a stress profile is provided. The glass article has a thickness t in a range from about 0.4 mm to about 1 mm and a center at t/2, a compressive layer extending from a surface of the glass article to a depth of layer DOL or a depth of compression DOC, and a tensile region under a physical center tension CT extending from the depth of layer to the center of the glass article. The glass article has a compressive stress CS1 after the first ion exchange step at the surface of from 100 MPa to 400 MPa and, in some embodiments, from 150 MPa to 300 MPa, and a depth of layer FSM_DOL greater than 0.14 or, in some embodiments, greater than 0.15·t following the first ion exchange step. The first ion exchange step is followed by a second ion exchange step after which the glass article has a compressive stress CS2 of greater than about than 500 MPa or, in some embodiments, greater than 700 MPa, at the surface and has a stress profile having a spike region in a range from about the surface to about 30 μm or, in some embodiments, to about 8 μm-15 μm. The stress profile in the spike region has a slope, which has an absolute value of greater than about 20 MPa/μm.

A method of strengthening a glass article is also provided. The glass article has a thickness t and a center at t/2. The method comprises: ion exchanging the glass article in a first ion exchange bath comprising a potassium salt and at least 30 wt % of a sodium salt to form a compressive layer having a compressive stress CS1 at the surface of from about 100 MPa to about 400 MPa, the compressive layer extending from a surface of the glass article to a depth of layer FSM_DOL of greater than 0.1·t, or depth of compression DOC, and a tensile region under a physical center tension CT extending from the depth of layer or depth of compression to the center of the glass article; and ion exchanging the glass article in a second ion exchange bath comprising at least 90 wt % of a potassium salt to form a spike region extending from the surface to about 30 μm below the surface. The spike region has a maximum compressive stress CS of greater than about 500 MPa at the surface, wherein the stress profile in the spike region has a slope, the slope having an absolute value of greater than about 20 MPa/μm.

These and other aspects, advantages, and salient features of the present disclosure will become apparent from the following detailed description, the accompanying drawings, and the appended claims.

DETAILED DESCRIPTION

Figure 1:
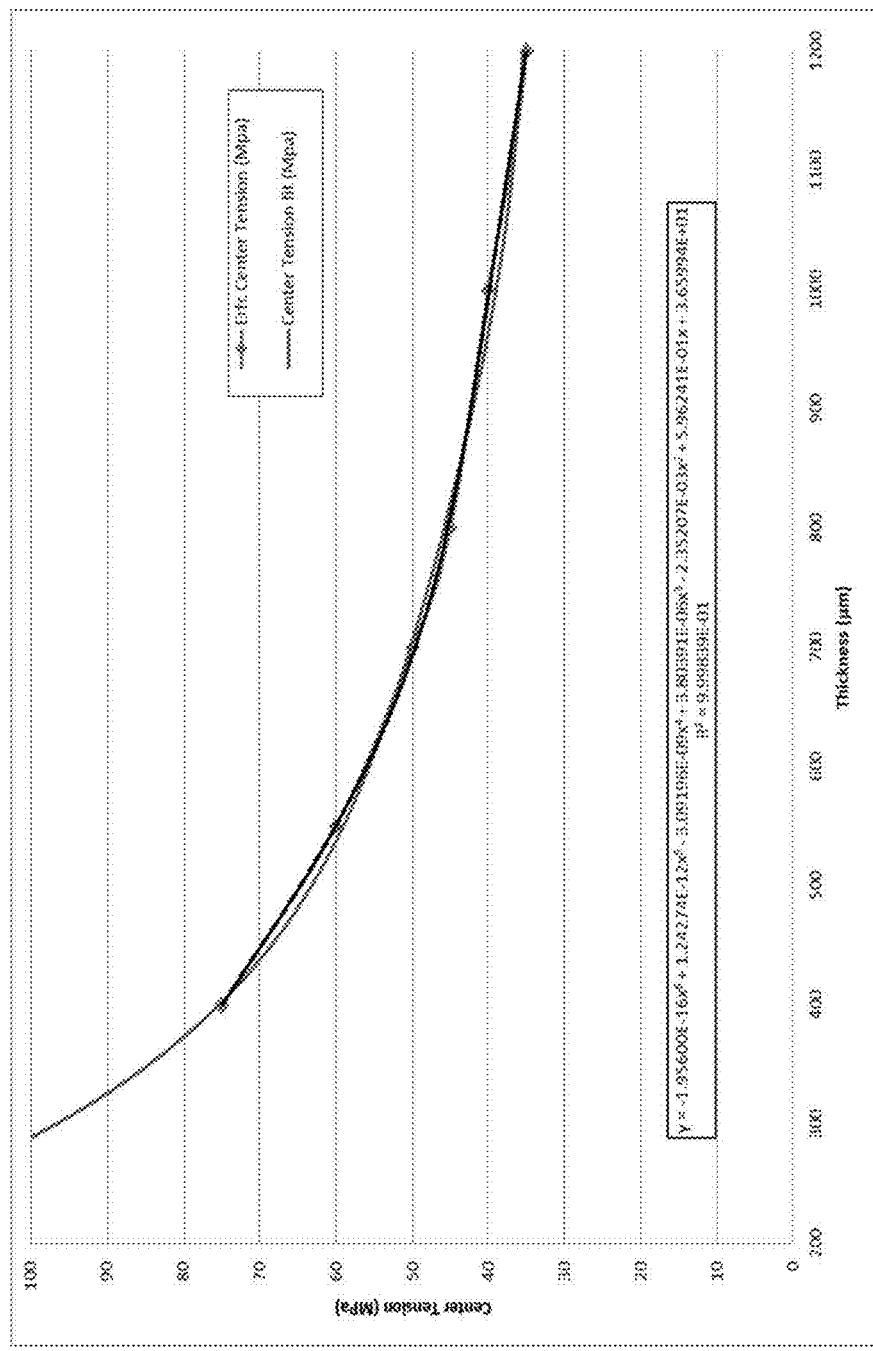
FIG. 1 is a plot of typical values of physical center tension (MPa) limits as a function of sample thickness.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant e.g., less than about 0.1 mol %.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are chemically strengthened glasses with "super-deep" DOL; i.e., glass samples having a depth of compressive layer of greater than about 120 μm and, in some embodiments, greater than about 140 μm, with a standard deviation around 4 μm, as determined by surface stress/FSM measurements (referred to herein as "FSM_DOL" or simply "DOL"). In some embodiments, the DOL may be about 186 μm with a standard deviation of about 10 μm.

The glasses described herein are ion exchangeable alkali aluminosilicate glasses, which, in some embodiments, are formable by down-draw processes, such as slot-draw, or fusion-draw processes that are known in the art. In particular embodiments, such glasses may have a liquidus viscosity of at least about 100 kiloPoise (kP), or at least about 130 kP. In one embodiment, the alkali aluminosilicate glass comprises $SiO_2$, $Al_2O_3$, $P_2O_5$, and at least one alkali metal oxide ($R_2O$), wherein $0.75 \leq [P_2O_5$ (mol %)$+R_2O$ (mol %))/$M_2O_3$ (mol %)]$\leq 1.2$, where $M_2O_3=Al_2O_3+B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. In some embodiments, 11 mol %$\leq M_2O_3 \leq 30$ mol %; in some embodiments, 13 mol %$\leq R_xO \leq 30$ mol %, where $R_xO$ is the sum of alkali metal oxides, alkaline earth metal oxides, and transition metal monoxides present in the glass; and in still other embodiments, the glass is lithium-free. These glasses are described in patent application Ser. No. 13/305,271, entitled "Ion Exchangeable Glass with Deep Compressive Layer and High Damage Threshold," filed Nov. 28, 2011, by Dana Craig Bookbinder et al. and claiming priority from U.S. provisional patent application No. 61/417,941, filed on Nov. 30, 2010, and having the same title, the contents of which are incorporated herein by reference in their entirety.

In certain embodiments, the alkali aluminosilicate glass comprises at least about 4 mol % $P_2O_5$, wherein ($M_2O_3$ (mol %)/$R_xO$(mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 to about 30 mol % $M_2O_3$, where $M_2O_3=Al_2O_3+B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, As$_2$O$_3$, Sb$_2$O$_3$, Cl, and Br; the glass is lithium-free; and 1.3<[(P$_2$O$_5$+R$_2$O)/M$_2$O$_3$]≤2.3, where R$_2$O is the sum of monovalent_cation oxides present in the glass. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

Glass samples with super-deep DOL µm were chemically strengthened in ion exchange baths having different "poisoning" levels—i.e., baths of a potassium salt "poisoned" with a sodium salt), and a number of them were found not to exhibit frangible behavior (explosive and energetic fragmentation upon impact or insult, often delayed) despite exceeding what has been considered to be the center tension CT limit above which such behavior is typically observed, thus confirming that the total energy criteria drives frangibility in these cases. Accordingly, the glasses exhibit non-frangible behavior in a regime where such behavior is not expected.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Frangible behavior and non-frangible behavior of strengthened glass articles may be determined by a point impact test using an instrument such as, for example, a scribe with a tungsten carbide tip, that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT.

Accordingly, the chemically strengthened glasses described herein are "non-frangible"—i.e., they do not exhibit frangible behavior as described hereinabove when subjected to impact by a sharp object.

Described herein are chemically strengthened glass articles for which FSM_DOL>0.1·t and, in some embodiments, FSM_DOL>0.15·t, where t is the thickness of the sample. The glasses are strengthened in an ion exchange bath containing a potassium salt that is "poisoned" with greater than about 30 wt % of a sodium salt such as NaNO$_3$. The thickness t is in a range from about 400 µm (0.4 mm) to about 2000 µm (2 mm).

Samples may also be strengthened using a two-step ion exchange (double IOX) process to further increase the compressive stress at the surface of the glass and thus create a compressive stress "spike" at the surface and extending to a depth of about 30 lam below the surface, and a "super-deep" DOL of about 150 µm without demonstrating frangibility.

Super-deep DOL samples using a double IOX process with a spike and FSM measured depth of layer FSM_DOL of greater than 120 µm, in some embodiments, ranging from about 140 µm to about 150 µm, and, in still other embodiments, possibly reaching FSM_DOL of at least about 186 µm are provided. These double ion-exchanged samples with a spike have a compressive stress maximum at in a range from about 800 MPa to about 900 MPa and are not frangible.

Compressive stress CS and depth of layer DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

As used herein, the terms "DOL" and "FSM_DOL" refer to the depth of the compressive layer as determined by surface stress measurements.

For strengthened glass articles in which the compressive stress layers extend to deeper depths within the glass, the FSM technique may suffer from contrast issues that affect the observed DOL value. At deeper depths of compressive layer, there may be inadequate contrast between the TE and TM spectra, thus making the calculation of the difference between the spectra of bound optical modes for TM and TE polarization—and accurate determination the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements in the glass such as, for example, the ion exchange of sodium for lithium.

The DOL as determined by the FSM is a relatively good approximation for the depth of compression (DOC) when the DOL is a small fraction r of the thickness t and the index profile has a depth distribution that is reasonably well approximated with a simple linear truncated profile. When the DOL is a substantial fraction of the thickness, such as DOL≥0.1·t, then the DOC is most often noticeably lower than the DOL. For example, in the idealized case of a linear truncated profile, the relationship DOC=DOL·(1−r) holds, where r=DOL/t.

The depth of compression Physical_DOL, also known as IWKB_DOL or DOCL (depth of compression layer) is determined from the spectra of bound optical modes for TM and TE polarization by using the inverse Wentzel-Kramers- Brillouin (IWKB) method. As used herein, Physical_DOL refers to the depth at which the stress is effectively zero inside the glass. This Physical_DOL is typically less than the FSM_DOL measured by the FSM instrument for a single Ion exchange process. For double ion exchange processes, the measured FSM_DOL is not a reliable metric, due to the nature of the instrument and its processing algorithm.

The shape and values of the stress profile in an ion exchanged glass are limited by a known frangibility limit. This frangibility limit is usually expressed in terms of the center tension CT, which is the value of the tensile stress in the center of the glass at the position x, where x=thickness/2. The center tension CT naturally occurs due to the force balance of the stress induced by the sample during the IOX process. The integral or sum of the stress at each point in the compressive part of the profile has to be equal to the integral or sum of the stress at each point in the tensile part of the profile, so that the sample is flat and not curved.

If one assumes a single IOX (SIOX) profile, diffusion is guided by a classical complementary error function. It has been found that the physical CT varies with glass thickness as shown in FIG. 1.

In FIG. 1, typical values of the physical center tension limit found as a function of the thickness of the sample for a SIOX is shown. A curve can be fit to the data in FIG. 1 to determine other physical center tension values between thicknesses of 200 μm to 1200 μm. The following equation may then be used to describe how classical physical CT values vary with thickness t, expressed in microns:

$$CT = -1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994 \quad (1).$$

Figure 2:
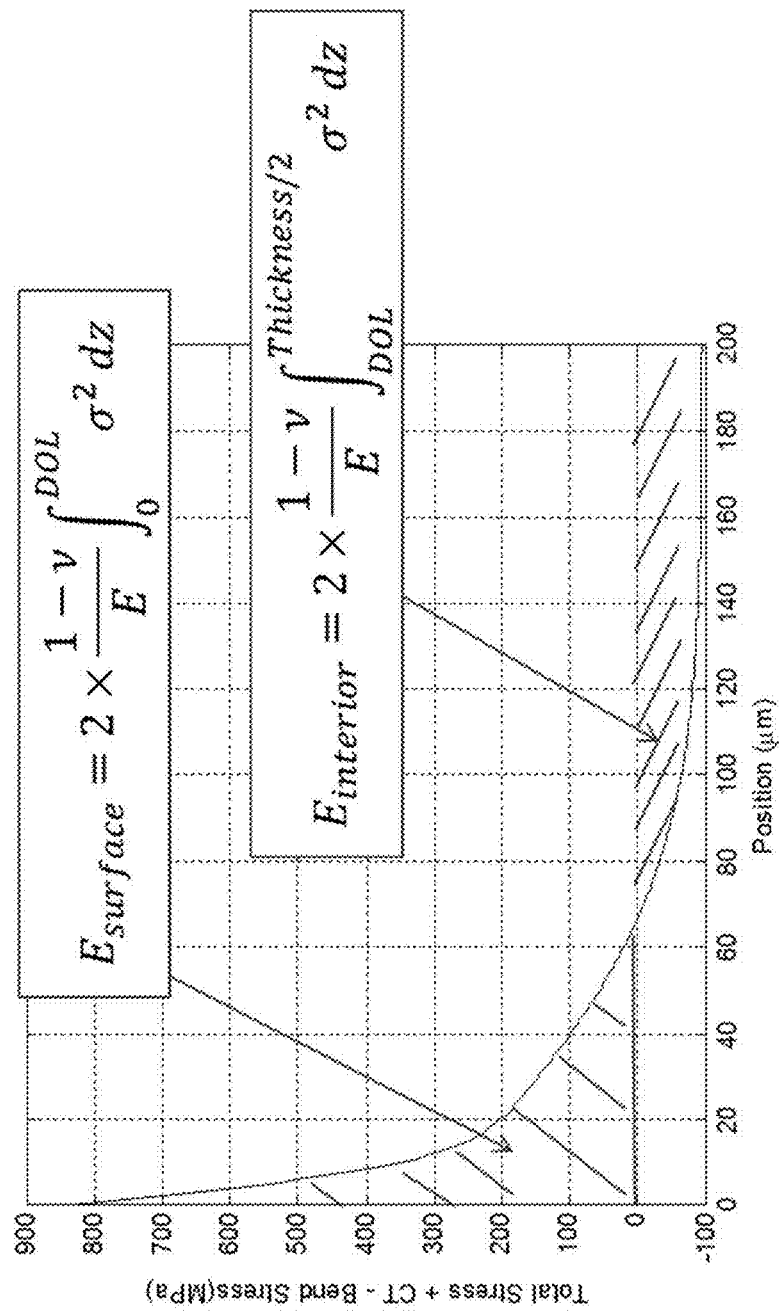
FIG. 2 is a plot of a stress profile of a double ion exchange sample.

When trying to find the ranges of values where a super-deep DOL sample can be made using a DIOX profile, another important parameter is the concept of elastic energy. A typical stress profile of a glass sample subjected to the double ion exchange (DIOX) process is schematically shown in FIG. 2. The energy stored in the surface is in compression and the energy stored in the interior of the sample is tension. The total energy $E_{total}$ is the sum of the energy in the surface plus the energy in the interior $E_{interior}$ of the sample. The factor of 2 in the equations shown in FIG. 2 indicates that both sides of the glass must be integrated and taken into account. The stress profile shown in FIG. 2 has a tail due to the first IOX step and a "spike" due to the second IOX step. The position of the spike occurs where the magnitude (i.e., absolute value) of the slope of the stress increases to a value of greater than about 20 MPa/μm.

The elastic energy stored by the stress profile is calculated according to the equation $$W_{el} = \frac{(1-\nu)}{E} \int \sigma^2 dx, \quad (2)$$

where ν is the Poisson ratio (0.22 for the example glass), E is Young's modulus (about 68 GPa for the example glass), and σ is the stress.

The elastic energy (per unit area of glass) in each compression region (one on each outer surface) is:

$$W_{el}^{comp} = \frac{1-\nu}{E} \int_0^{DOC} \sigma^2 dx. \quad (3)$$

The elastic energy in the tension region from the compression depth to the center of the glass substrate is:

$$W_{el}^{tens} = \frac{1-\nu}{E} \int_{DOC}^{0.5t} \sigma^2 dx. \quad (4)$$

The total elastic energy stored in the substrate is twice the sum of the elastic energy of the single compression region and the half tension region:

$$W_{el}^{tot} = 2(W_{el}^{comp} + W_{el}^{tens}) \quad (5).$$

Units for the quantities found in equations 2-5 are:
for stress: [σ]=MPa≡$10^6$ N/m²;
for depth: [x]=μm=$10^{-6}$ m; and
for elastic energy (per unit substrate area):

$$[W_{el}] = MPa^{-1} * MPa * 10^6 \frac{N}{m^2} * 10^{-6} m$$
$$\equiv \frac{N*m}{m^2}$$
$$\equiv \frac{J}{m^2}$$
$$\equiv \frac{\mu J}{mm^2}$$

Another metric is the elastic energy per unit substrate area per unit thickness of the substrate, expressed in terms of J/m² mm. This is a more universal parameter because it is independent of the thickness of the glass sample. The elastic energy per thickness of the substrate is valid from thicknesses ranging from 50 μm to 2000 μm.

In one embodiment, a frangibility criterion may be introduced in the form of a normalized total energy, which defined as:

$$W_{norm}^{tot} = \frac{W_{el}^{tot}}{\left(\frac{1-\nu}{E}\right)} = \int_0^{Thickness} \sigma^2, \quad (6)$$

Based on the above concepts, several double IOX experiments were performed on 0.8 mm thick alkali aluminosilicate glass, which is described in U.S. patent application Ser. No. 13/305,271, and has a nominal composition of about 57 mol % $SiO_2$, 0 mol % $B_2O_3$, about 17 mol % $Al_2O_3$, about 7% $P_2O_5$, about 17 mol % $Na_2O$, about 0.02 mol % $K_2O$, and about 3 mol % MgO. Here, detailed stress profile extraction using an IWKB-based algorithm was employed. The method is described in U.S. Pat. No. 9,140,543, entitled "Systems and Methods for Measuring the Stress Profile of Ion-Exchanged Glass," filed May 3, 2012, by Douglas C. Allan et al. and claiming priority from U.S. provisional patent application No. 61/489,800, filed on May 25, 2011, and having the same title, the contents of which are incorporated herein by reference in their entirety. The above procedure allowed the approximated physical stress profile to be extracted and the Physical_DOL or depth of compression layer (DOCL) where the stress effectively crosses from compressive stress to tensile stress at—and equals—zero to be pinpointed. By balancing tensile and compressive forces across the sample, the physical CT may be computed. In addition, it is also possible to approximate the elastic energies in compression and tension, as well as the total elastic energy. In some embodiments, the Physical_DOL is greater than 0.8·t and, in some embodiments, greater than 0.12·t.

Examples of super-deep DOL obtained by the double or two-step IOX processes are listed in Tables 1a and 1b. Table 1a includes parameters (bath composition, temperature, ion exchange time) for the first and second ion exchange baths and compressive stresses CS and depths of layer DOL, measured by FSM, following each ion exchange step. Table 1b lists sample frangibility; depth of compression DOC, compressive stress CS, and physical center tension CT as determined by the IWKB treatment; compressive, tensile, and total energies, and total energy normalized for thickness. The glass samples listed in the tables each had a thickness of 800 µm and the composition previously described hereinabove. All samples shown in Tables 1a and b are non-frangible, including some samples for which the physical CT as determined by the IWKB method is above the previously reported CT frangibility limit of $CT_{max}$=−45 MPa for 800 µm thick glass. These samples track the elastic energy in the sample more closely, and if the correct region of process parameters and stress profile targets of CS and DOL of the first and second ion exchange steps are targeted, super-deep depths of layer and compression that were previously believed to be unattainable may be achieved.

The depths of layer DOL1 as measured with the FSM-6000 instrument for the first ion exchange step were in a range from 136.6 µm to 180.4 µm and the compressive stresses CS1 were in a range from 189 MPa to 245 MPa. Following the second IOX step, the CS peak or spike was the range from 852 MPa to 890 MPa. The spike extends from the surface to a depth of about 10 µm to about 11 µm. The peak width may, in practice, be somewhat controlled depending on the immersion time in the second IOX bath. Peak widths from about 1 µm to 25 µm and, in some embodiments, up to about 30 µm are possible for the spike region, depending on the elastic energy stored in the sample.

Figure 3:
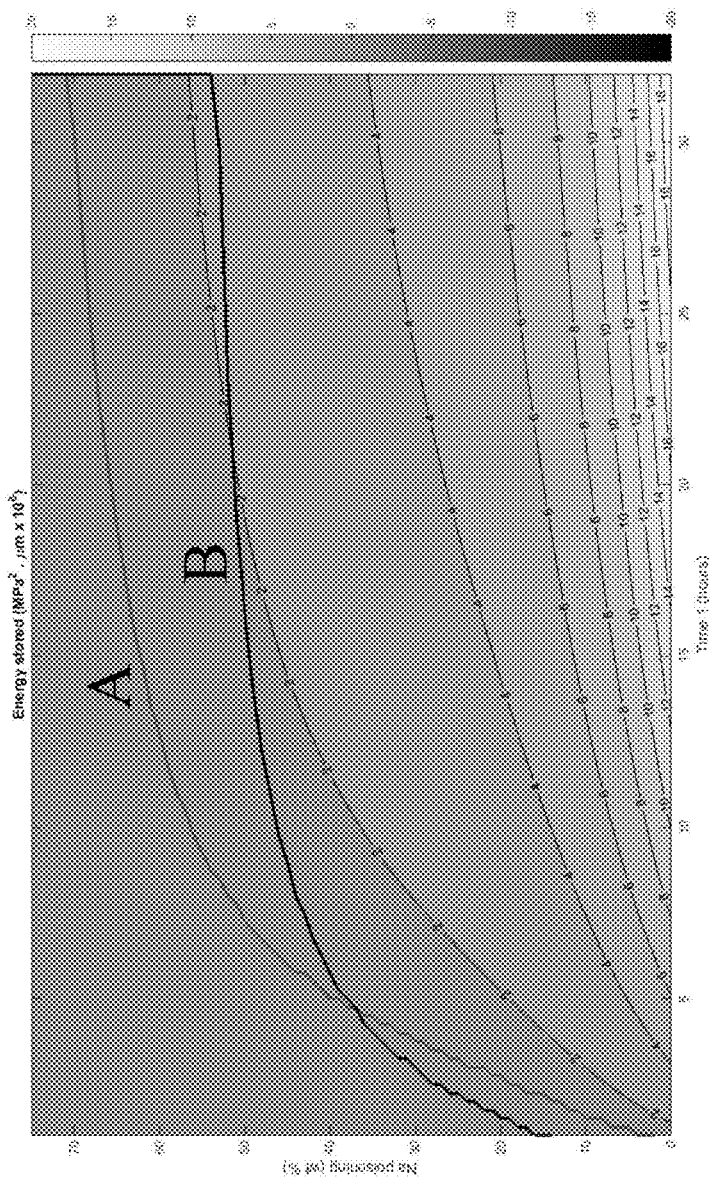
FIG. 3 is a map of the area of interest for an alkali aluminosilicate glass having a Poisson ratio v=65 GPa and a Young's modulus E=65 GPa.

For glass samples having the above composition with 800 µm thickness, two regions of interest have been identified based on concepts of physical CT and elastic energy. The first region of interest is shown in FIG. 3, which is a map of an area of interest for a glass having a Poisson ratio ν=65 GPa and a Young's modulus E=65 GPa. The upper line A in FIG. 3 is the frangibility limit that has been believed to exist, where CT=−45 MPa for a 800 µm thick sample. Line B in FIG. 3 is the normalized total energy, which is the integral of the stress squared. Line B is the lower limit with a value of $E_{total}$=11.65 MPa²·µm×10⁶, and corresponds to a non-normalized total energy of $E_{total}$=139.8 J/m². Normalizing the thickness, $(E_{total}t)$=174.75 J/m²·mm for thickness t=0.8

TABLE 1a

Ion exchange parameters for the first and second ion exchange baths and compressive stresses CS and depths of layer DOL, measured by FSM for double-IOX processes (DIOX) for alkali aluminosilicate glass samples having a thickness of 800 µm.

| | IOX step 1 | | | | | IOX step 2 | | | | |
|---|---|---|---|---|---|---|---|---|---|---|
| Sample | wt % Na | time (h) | Temp (° C.) | Mean CS1 (FSM) [MPa] | Mean DOL1 (FSM) [µm] | wt % Na | time (h) | Temp (° C.) | Mean CS1 (FSM) [MPa] | Mean DOL1 (FSM) [µm] |
| 1 | 57 | 15 | 460 | 201.5 | 136.6 | 0.5 | 0.25 | 390 | 201.5 | 136.6 |
| 2 | 57 | 17.5 | 460 | 196.7 | 148.7 | 0.5 | 0.25 | 390 | 196.7 | 148.7 |
| 3 | 57 | 20.1 | 460 | 195.8 | 154.8 | 0.5 | 0.25 | 390 | 195.8 | 154.8 |
| 4 | 57 | 26 | 460 | 194.2 | 163.8 | 0.5 | 0.25 | 390 | 194.2 | 163.8 |
| 5 | 57 | 28 | 460 | 192.8 | 176.6 | 0.5 | 0.25 | 390 | 192.8 | 176.6 |
| 6 | 57 | 32.1 | 460 | 189.1 | 180.4 | 0.5 | 0.25 | 390 | 189.1 | 180.4 |
| 7 | 49 | 15 | 460 | 245.5 | 143.8 | 0.5 | 0.25 | 390 | 245.5 | 143.8 |
| 8 | 49 | 17.25 | 460 | 242.0 | 157.0 | 0.5 | 0.25 | 390 | 242.0 | 157.0 |

TABLE 1b

Sample frangibility; depth of compression DOC, compressive stress CS, and physical center tension CT as determined by the IWKB treatment; compressive, tensile, and total energies, and total energy normalized for thickness, determined for the double ion exchanged samples listed in Table 1a.

Figure 4:
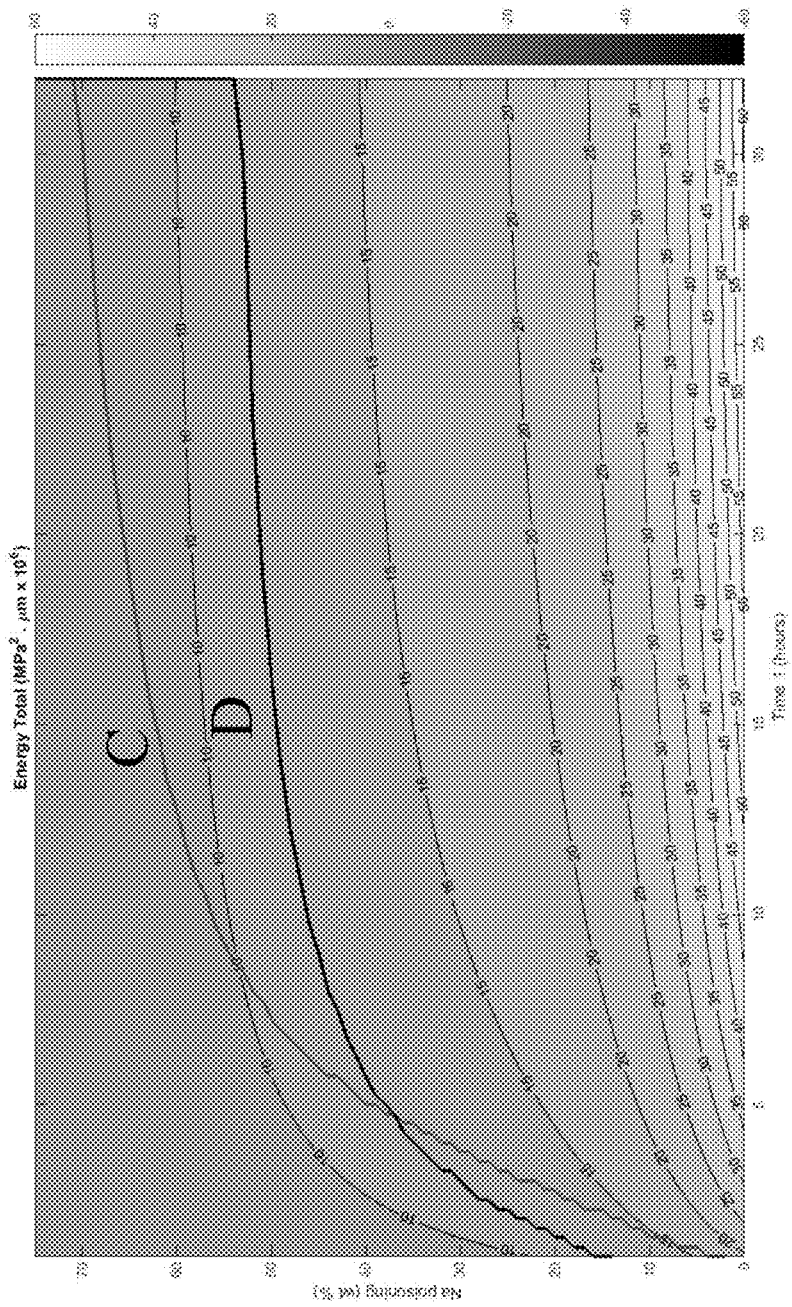
FIG. 4 is a second map of the area of interest for the case of an alkali aluminosilicate glass which has a Poisson ratio v=65 GPa and a Young's modulus E=65 GPa.

| Sample | Frangible | IWKB DOC (µm) | IWKB CS (MPa) | IWKB CT (MPa) | Compressive Energy (J/m²) | Tensile Energy (J/m²) | Total Energy (J/m²) | Total Energy (J/m² · mm) |
|---|---|---|---|---|---|---|---|---|
| 1 | no | 96.81 | 921.38 | −38.73 | 85.08 | 10.92 | 96.00 | 120.00 |
| 2 | no | 100.72 | 901.46 | −40.17 | 85.47 | 11.59 | 97.06 | 121.33 |
| 3 | no | 107.92 | 927.36 | −43.27 | 87.49 | 13.12 | 100.62 | 125.77 |
| 4 | no | 115.48 | 983.50 | −46.46 | 91.15 | 14.74 | 105.89 | 132.36 |
| 5 | no | 117.53 | 956.90 | −47.36 | 89.02 | 15.20 | 104.23 | 130.28 |
| 6 | no | 124.91 | 833.79 | −50.87 | 88.14 | 17.09 | 105.23 | 131.54 |
| 7 | no | 103.57 | 948.16 | −48.53 | 105.13 | 16.75 | 121.88 | 152.35 |
| 8 | no | 108.57 | 882.65 | −51.09 | 101.20 | 18.26 | 119.47 | 149.33 | mm, which is a more universal value that is thickness independent. The area of interest is the area between lines A and B and can be described to be an area where Physical CT>|45 MPa| and $E_{total}$<139.8 J/m² for a thickness t=800 μm. For a generic thickness, independent physical CT is greater than $$|-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|,$$

where t is the thickness in microns and $(E_{total}/t)$=174.75 J/m²·mm, where t is the same thickness, expressed in millimeters, for any dual IOX profile. The parameters described by the area between lies A and B in FIG. 3 describe the poisoning level and ion exchange time of the first IOX step. The second region of interest can be visualized with the help of FIG. 4, which shows a map of an area of interest for the glasses described herein having a Poisson ratio ν=65 GPa and a Young's modulus E=65 GPa. The upper line C is the frangibility limit that has been believed to exist, where CT=−45 MPa for a 800 μm thick sample. Line D is the normalized energy stored in the interior $E_{interior}$ of the sample that is in tension, which is the integral of the stress squared from the point where the stress crosses zero to the center of the sample and multiplied by 2 to take into account both sides of the sample. Line D in FIG. 4 is the lower limit with a value of $E_{interior}$=2 MPa²·μm×10⁶, which corresponds to a non-normalized total energy of $E_{interior}$=24 J/m². Normalizing the thickness will result in $(E_{interior}/t)$=30 J/m²·mm for a thickness t=800 μm, which is a more universal value that is independent of thickness. The area of interest to be claimed is the area between lines C and D can be described as an area where CT is greater than the equations included in FIG. 1 and $(E_{interior}/t)$<30 J/m²·mm, which is valid for most thicknesses. Alternatively, the parameters describe in the area between lines C and D of FIG. 4 describe poisoning levels and ion exchange times of the first IOX step. This area again illustrates the area of interest between limit lines C and black D and can be described to be an area where: Physical CT>|45 MPa| and $E_{interior}$<24 J/m² for a thickness t=800 μm. Alternatively, for a generic thickness, independent physical CT>|−1.956× $10^{-16} \times t^6 + 1.24274 \times 10^{-12} \times t^5 - 3.09196 \times 10^9 \times t^4 + 3.80391 \times 10^{-6} \times t^3 - 2.35207 \times 10^{-3} \times t^2 + 5.96241 \times 10^{-1} \times t + 36.5994|$, where t is the thickness in microns and $(E_{interior}/t(mm))$=30 J/m²·mm for any dual or two-step IOX profile.

Figure 5:
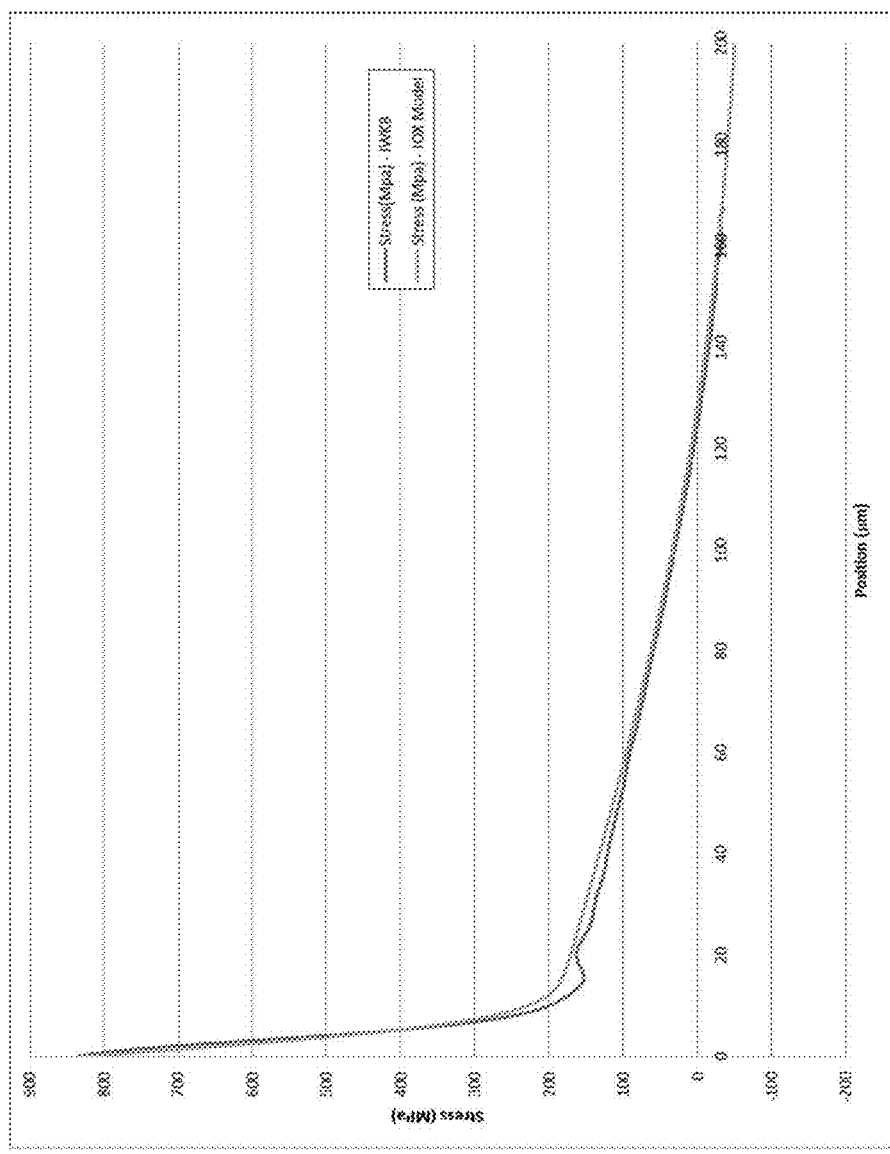
FIG. 5 is an example of a compressive stress profile for a non-frangible glass sample strengthened using a first ion exchange step of 32.1 hours at a temperature of 460° C. in a bath containing 57 wt % $NaNO_3$ and 53 wt % $KNO_3$.

Additional non-frangible samples having super-deep DOL have also been obtained using longer IOX times, as shown in FIG. 5, which shows an example of a super-deep IOX non-frangible stress profile obtained with a first IOX step of 32.1 hours at a temperature of 460° C. using a bath containing 57 wt % of NaNO₃ and the remaining 53 wt % being KNO₃. This is followed by second IOX of 15 minutes (0.25 hours) at a temperature of 390° C. in a bath containing 0.5 wt % NaNO₃+0.5 wt % of silicic acid+99% KNO₃ to achieve a spike. An inverse-WKB (IWKB) procedure was used to retry the approximated stress profile. An approximate finite-difference IOX model was also used, resulting in good agreement between theory and measurements. The depth of compression layer DOCL where the stress crosses zero as pointed out by the IWKB and IOX model was about 130 In this case, the values obtained with the FSM-6000 yielded CS=890.3 MPa and DOL=180.4 μm. The range of values between DOL=120 and DOL=200 μm and, in some embodiments, between DOL=140 μm to 150 μm, can be deemed super-deep DOL samples. This super-deep IOX stress profile again is non-frangible.

Figure 6:
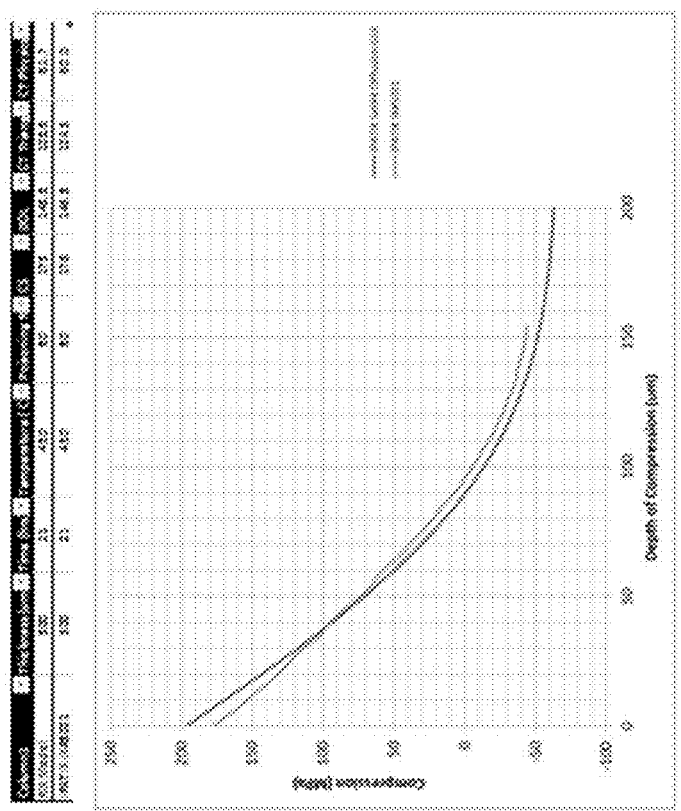
FIG. 6 is an example of a compressive stress profile for a glass having a thickness of 500 μm.

Other examples of super-deep IOX profiles were also obtained at a thickness of 500 μm, where a non-frangible stress profile was made after a first IOX step of 21 hours at 460° C. in a bath containing 60% NaNO₃ and 40% KNO₃, resulting in an FSM-6000 DOL in the 146-149 μm range and a CS of 177 MPa. The IWKB procedure was used to characterize the stress profile with a measured DOCL of 95.8 μm, CT of 60 MPa, $E_{interior}$ of 10.5 J/m² or $(E_{interior}/t)$ of 21 J/m²·m and total energy $E_{total}$ of 30 J/m² or $(E_{total}/t)$ of 60 J/m²·mm well below the upper limit of 174.75 J/m²·mm. This example is illustrated in FIG. 6. A DIOX stress profile, which includes a spike while maintaining the super-deep DOL as described in the examples above, may be designed based on this example. For example, a DIOX process with a first step ion-exchange at 460° C. using a NaNO₃/KNO₃ ion exchange bath having a slightly higher level (61 wt %) of NaNO₃ with a duration of 30 hours, combined with the spike process described above, may, for example, be used for 500 μm thick glass to obtain a non-frangible glass having a physical center tension CT of 96.9 MPa, total energy $(E_{total}/t)$ of 173.8 J/m²·mm, a FSM-6000 DOL of 194 μm, DOCL of 91.4 μm, and CS of 823 MPa. In another embodiment of the DIOX process, a first IOX step of 30 hours at 460° C. in a NaNO₃/KNO₃ ion exchange bath containing 65 wt % NaNO₃, combined with the spike process described above results in a non-frangible glass having a physical center tension CT of 85 MPa, a $E_{interior}/t$ of 29.4 J/m²·m, a total energy $E_{total}/t$ of 164 J/m²·mm, a FSM-6000 DOL of 194 μm, DOCL of 88.4 μm, and CS of 835 MPa.

In another aspect a method of strengthening a glass article having a thickness t is provided. The method comprises a step in which the glass article is ion exchanged in a first ion exchange bath comprising a potassium salt and at least 30 wt % of a sodium salt to form a compressive layer extending from a surface of the glass article to a depth of layer FSM_DOL of greater than 0.1·t, or a depth of compression DOC and a tensile region under a physical center tension CT extending from the depth of layer or depth of compression to the center of the glass at t/2. The compressive layer has a compressive stress CS1 at the surface from about 100 MPa to about 400 MPa. In a second step, the glass article is ion exchanged in a second ion exchange bath comprising at least 90 wt % of a potassium salt to form a spike region extending from the surface to a depth in a range from about 1 μm to about 30 μm below the surface. The spike region has a maximum compressive stress CS of greater than about 500 MPa at the surface, and the stress profile in the spike region has a slope having an absolute value of greater than about 20 MPa/μm. The glass article strengthened according to this method is non-frangible.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure and appended claims.

The invention claimed is:
1. A glass article comprising:
   a thickness t in a range from 0.4 mm to about 1.5 mm,
   a center at t/2,
   a compressive layer extending from a surface of the glass article to a depth of compression DOC as measured by the inverse Wentzel-Kramers-Brouillon (IWKB) method, and a tensile region under a physical center tension CT extending from the DOC to the center, wherein:

a. the physical center tension CT as measured by the IWKB method in MPa is greater than $|-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, wherein t is in microns; and b. the glass article has a total elastic energy normalized per thickness of the glass $E_{total}$, wherein ($E_{total}$/t (mm)) is less than or equal to 174.75 J/m²·mm.

2. The glass article of claim 1, wherein the thickness is 0.8 mm, the physical center tension CT is greater than |45 MPa|, and the total elastic energy $E_{total}$ is less than about 139.8 J/m².

3. The glass article of claim 1, wherein the thickness is 0.5 mm, the physical center tension CT is greater than |63 MPa|, and the total elastic energy $E_{total}$ is less than 87.4 J/m².

4. A glass article comprising:
a thickness t in a range from about 0.4 mm to about 1 mm,
a compressive layer extending from a surface of the glass article to a depth of compression DOC as measured by the inverse Wentzel-Kramers-Brouillon (IWKB) method,
a center at t/2, and
a tensile region under a physical center tension CT extending from the DOC to the center of the glass, wherein:
a. the physical center tension CT as measured by the IWKB method in MPa is greater than $|-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, wherein t is in microns; and b. the glass article has an elastic energy stored in the interior of the sample in tension of $E_{interior}$, wherein ($E_{interior}$/t(mm)) is less than or equal to 30 J/m²·mm.

5. The glass article of claim 4, wherein the thickness is 0.8 mm, the physical center tension CT is greater than |45 MPa| and $E_{interior}$ is less than about 24 J/m².

6. The glass article of claim 4, wherein the thickness is 0.5 mm, the physical center tension CT is greater than |63 MPa| and $E_{interior}$ is less than about 18 J/m².

7. The glass article of claim 1, further comprising a stress profile as measured by the IWKB method having a spike region extending from the surface to a depth less than the DOC, the spike region having a slope, wherein the slope has an absolute value of greater than about 20 MPa/μm.

8. The glass article of claim 1, further comprising a stress profile as measured by the IWKB method having a spike region extending from the surface to about less than or equal to 30 μm below the surface.

9. The glass article of claim 4, further comprising a stress profile as measured by the IWKB method having a spike region extending from the surface to about less than or equal to 30 μm below the surface.

10. The glass article of claim 4, wherein the DOC is greater than 0.1*t.

11. An electronic device comprising the glass article of claim 1.

12. An electronic device comprising the glass article of claim 4.

* * * * *

UNITED STATES PATENT AND TRADEMARK OFFICE
CERTIFICATE OF CORRECTION

PATENT NO. : 10,239,784 B2
APPLICATION NO. : 14/932411
DATED : March 26, 2019
INVENTOR(S) : Pascale Oram et al.

It is certified that error appears in the above-identified patent and that said Letters Patent is hereby corrected as shown below:

On the Title Page

Page 2, Column 2, item [56], delete "Opinoin" and insert -- Opinion --, therefor.

In the Claims

Column 12, Line 60, Claim 1, delete "tin" and insert -- t in --, therefor.

Column 13, Line 17, Claim 4, delete "tin" and insert -- t in --, therefor.

Signed and Sealed this
Thirteenth Day of August, 2019

Andrei Iancu
*Director of the United States Patent and Trademark Office*